(No Model.) 2 Sheets—Sheet 1.

R. PLATMAN.
SEED DRILL AND FERTILIZER DISTRIBUTER.

No. 271,736. Patented Feb. 6, 1883.

Attest.
J. H. Crawford
E. P. Follett

Inventor.
Robert Platman
per R. F. Osgood, atty.

(No Model.) 2 Sheets—Sheet 2.
R. PLATMAN.
SEED DRILL AND FERTILIZER DISTRIBUTER.
No. 271,736. Patented Feb. 6, 1883.
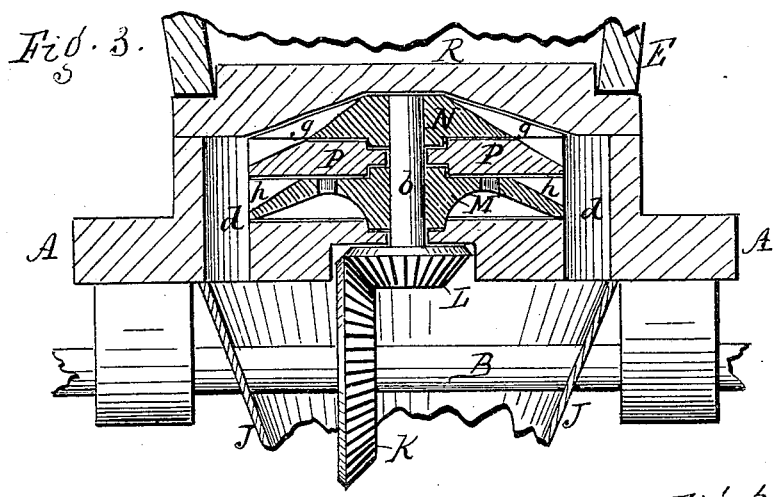
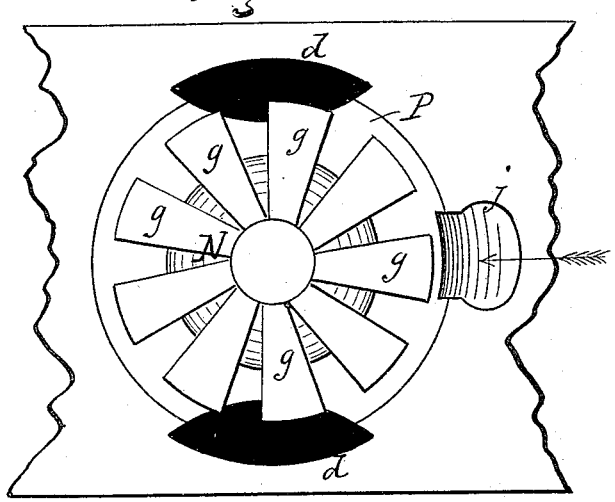
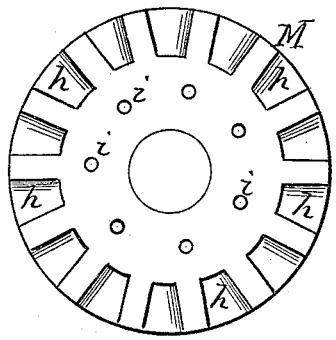
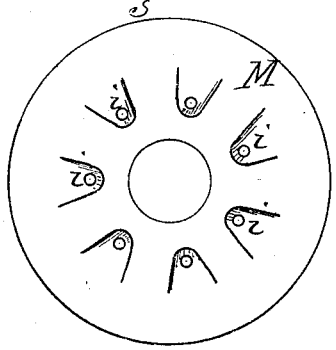
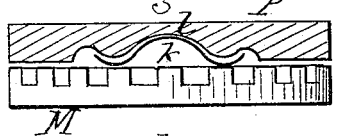
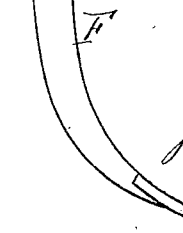
Attest:
J. B. Crawford
E. P. Follett
Inventor.
Robert Platman,
per R. F. Osgood,
atty.
N. PETERS, Photo-Lithographer, Washington, D. C.

UNITED STATES PATENT OFFICE.

ROBERT PLATMAN, OF BELLONA, NEW YORK.

SEED-DRILL AND FERTILIZER-DISTRIBUTER.

SPECIFICATION forming part of Letters Patent No. 271,736, dated February 6, 1883.

Application filed April 24, 1882. (No model.)

*To all whom it may concern:*

Be it known that I, ROBERT PLATMAN, of Bellona, Yates county, New York, have invented a certain new and useful Improvement in Seed-Drills and Fertilizer-Distributers; and I do hereby declare that the following is a full, clear, and exact description of the same, reference being had to the accompanying drawings, in which—

Figure 1:
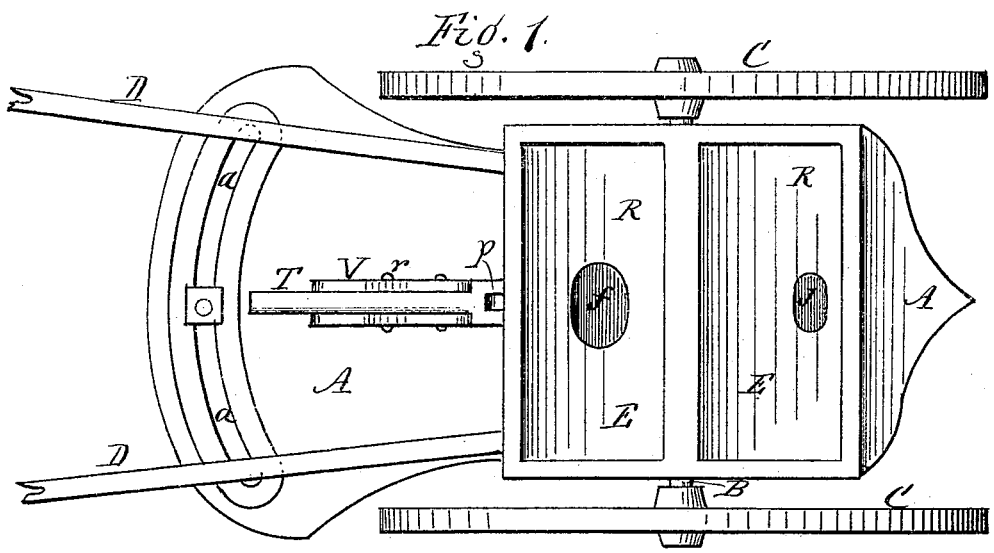
Figure 2:
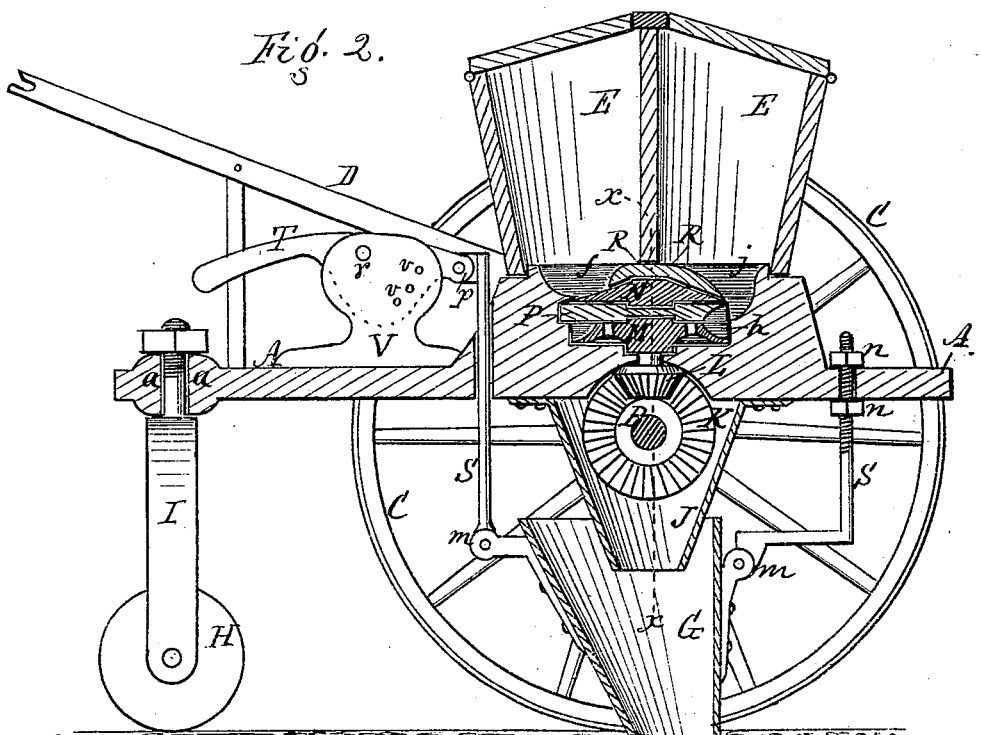

Figure 1 is a plan of the machine. Fig. 2 is a longitudinal vertical section of the same. Fig. 3 is an enlarged section at right angles to Fig. 2, the line of section being indicated by x x. Fig. 4 is a plan showing the disk for distributing the fertilizer and the bed upon which it rests. Figs. 5 and 6 are obverse and reverse views of the seed-disk. Figs. 7 and 8 are views showing the spring for clearing the surface of the seed-disk. Fig. 9 is an elevation of the cultivator-tooth.

My improvement relates to an apparatus whereby the seed is dropped and the fertilizer distributed at one and the same operation.

The invention consists in the construction and arrangement of parts hereinafter described and claimed.

In the drawings, A indicates a frame resting upon an axle, B, supported by wheels C C and guided by handles D D. In this form the machine is propelled by pushing forward with the handles.

E E is a double hopper, the seed being placed in one side and the fertilizer in the other, and G is a drill-tooth which enters the ground, and through which the seed and the fertilizer are dropped from a guide-tube, J, above, in the ordinary way.

H is a roller attached in a yoke, I, in the rear, the shank of the yoke passing up through a slot, a, in the rear part of the main frame. The roller simply passes over the row and presses down the earth.

My improvement is as follows:

K is a bevel-gear fast on the axle B, and L is a bevel-pinion which engages therewith, the same being located on the under side of the frame.

b is a short vertical shaft, made fast to the pinion.

M is a seed-disk, and N a distributing-disk for the fertilizer, both made fast to the short shaft b and revolving with it. These two disks are at some distance apart, and between them is a stationary plate, P, which forms a part of the main frame, but on the two opposite sides has two discharge-openings, d d, for the united discharge of the seed and the fertilizer, as will be presently explained. Fig. 4 shows a top view of this plate or bed and the fertilizer-disk on top.

R represents the bed or bottom of the hopper. In one side is a hole or opening, f, which rests directly over the fertilizer-disk, N, and the fertilizing material, being placed in this side of the hopper, falls through this opening on top of the disk, and thence is carried around by the disk and is dropped through the side opening, d, into the tube J, and thence falls into the drill-tooth G. The distributing-disk N is made of cone form, as shown, so as to work the material off to the outer edge, and it is filled with a series of indentations or notches, g g, Fig. 4, which catch and hold the fertilizer and carry it around in successive charges, so that it drops through the side opening, d, at intervals corresponding with the hills in which the seed is dropped. In the other side of the hopper, which contains the seed, is also a hole or opening, j, in the bed, said opening extending down and extending under the edge of the stationary plate P and below the fertilizer-disk, as shown in Fig. 2. At this point it passes into the pockets h h of the seed-disk M, and the seed passing around with the disk is dropped into the side opening, d. The pockets are made inclined so as to discharge the seed freely, and the size of the pockets is such as to gage the proper amount of seed. By arranging the seed-pockets and the fertilizer-pockets in the same vertical line, they can be made to drop at the same time, thus bringing the materials together when they reach the ground, and planting in hills when desired. The seed-disk M is made invertible, and is made hollow upon the opposite side from the pockets h h, and has a series of holes, i i, toward the center, so that by simply inverting the disk the seed will be received from the opening j in the hollow of the disk, and then will pass through the holes i i, and will be discharged through the side opening, d, as before described. By this means larger seeds may be dropped by the same disk by simply inverting it. A curved or convex spring, $k$, Figs. 7 and 8, is placed in a depression, $l$, of the fixed plate P, its ends resting on top of or in close contact with the seed-disk M, by which means the seed is leveled and evened in the pockets, securing uniformity and preventing choking or clogging.

By the arrangement above described the seed and fertilizer disks are attached to the same shaft, receive equal movement, drop their loads simultaneously, so that the seed and the fertilizer fall together, and the seed in entering the disk passes beneath the fertilizer-disk without any danger of commingling while being distributed.

To the top of the drill-tooth are attached two elbow-shaped standards, S S, which are hinged at $m\,m$. The front standard is threaded, passes up through the main frame, and has two nuts, $n\,n$, by which it is securely clamped in place at any adjustment. The rear standard also extends up through the main frame, and has at its top a lug, $p$, to which is pivoted the front end of a lever, T, pivoted at $r$ to a bearing, V. By operating the lever the rear standard S can be raised or lowered, thus changing the angle or pitch of the tooth. It can be set at any adjustment by setting a pin in any of a series of holes, $v\,v$, which pass through the bearing and the lever. The front standard allows the tooth to be raised or lowered bodily, while the rear standard allows the angle or pitch to be changed, as before described.

F F are cultivator-teeth, which may be set into the slot $a$ by removing the roller H when it is desired to cultivate.

The machine is readily converted into a power-drill by making slight changes in the gearing.

Having thus described my invention, I do not claim a revolving disk and cut-off such as is shown in Patent No. 125,705; but

I claim—

1. In a seed-planter and fertilizer-distributer, the two disks M N, attached to the same shaft, $b$, and provided with pockets which stand in the same vertical line, in combination with the covering-plates P R and side discharge-openings, $d\,d$, the plate R having feed-openings $f\,j$, which communicate with the disks, as shown and described, and for the purpose specified.

2. The combination of the two disks M N, attached to the shaft $b$, the two plates P R, covering the disks, and the curved spring $k$, set into a cavity of the lower plate, its ends resting over the top of and in close contact with the lower disk, as shown and described, and for the purpose specified.

In witness whereof I have hereunto signed my name in the presence of two subscribing witnesses.

ROBERT PLATMAN.

Witnesses:
JOHN H. PLATMAN,
CHAS. S. COLEMAN.